US006058587A

United States Patent [19]

Smallwood

[11] Patent Number: 6,058,587

[45] Date of Patent: May 9, 2000

[54] CLAMPS FOR SEPARATING PORTION OF ROLL PROCESSING LINE

[75] Inventor: Edwin K. Smallwood, Humboldt, Tenn.

[73] Assignee: NCR Corporation, Dayton, Ohio

[21] Appl. No.: 08/955,316

[22] Filed: Oct. 21, 1997

[51] Int. Cl.[7] ...... B23P 19/00

[52] U.S. Cl. ...... 29/426.1; 493/288; 225/93; 225/101; 411/798.9

[58] Field of Search ...... 29/426.1, 426.5; 225/93, 96.5, 100, 101; 493/287, 288, 289, 290; 221/210, 289, 290; 198/406, 459.1; 414/798.9, 746.7, 911; 242/533, 559.3, 561; 269/268

[56] References Cited

U.S. PATENT DOCUMENTS

| | | | |
|---|---|---|---|
| 3,318,594 | 5/1967 | Weiser | 269/268 |
| 3,904,097 | 9/1975 | Grambo, Jr. et al. | 225/103 |
| 5,193,791 | 3/1993 | Schwarz | 269/268 |

OTHER PUBLICATIONS

Four pages from Gerhart Manual, subsidary of Double "H" Plastics, Inc. Warminster, Pennsylvania, USA, pp 4–7, (no publication date is known).

*Primary Examiner*—David P. Bryant
*Assistant Examiner*—Jermie E. Cozart
*Attorney, Agent, or Firm*—Charlene Stukenborg

[57] ABSTRACT

Clamps for a separating portion of a roll processing line are provided. The clamps include a pair of flattened cylinders which contact the roll to be separated.

9 Claims, 2 Drawing Sheets

CLAMPS FOR SEPARATING PORTION OF ROLL PROCESSING LINE

BACKGROUND OF THE INVENTION

The present invention relates to clamps for a separating portion of a roll processing line.

When processing rolls such as paper rolls, the group of rolls (called a log) is removed from a mandrel and is typically transported down a conveyor belt. The log is typically wider than the desired rolls and is formed of multiple rolls which have been cut to the desired width. Sometimes the rolls forming the log are loose when removed from the mandrel. Other times the rolls interleave during winding or otherwise remain attached, and it is very difficult to break them apart.

A stationary clamp and a separator clamp or breaker clamp are used to separate rolls in a system such as that provided by Gerhart subsidiary of Double "H" Plastics, Inc. of Warminster, Pa. These Gerhart stationary and separator clamps have a "v"-shape, such as may be formed using an angle iron. The stationary clamp holds the log, and the separator clamp holds the roll that is being separated. To adequately contact the log and roll to be separated, the clamps are sized for the outer diameter of the log to be separated. If a number of roll sizes are to be processed, the clamps must be checked and changed if necessary. The Gerhart roll processing line manual describes the criteria and method for changing the clamps and is hereby incorporated by reference.

The v-shaped clamps which contact the outer diameter of the roll may cause "marking" on the roll. An example of marking occurs when the capsules in carbonless paper are ruptured by the v-shaped clamps while performing the separation operation. Additionally, as the separator clamp rotates forward to force the roll downward, the clamps may scrape the edge and/or back of the separated roll because the separator clamp contacts the end of the roll closest to the stationary clamp. Another problem with the current separator clamp is that it tends to shear the roll from the log, making the roll less likely to rotate to its side before hitting a second conveyor for transporting the separated rolls to the packaging or other processing area.

There is a need to provide a stationary clamp and a separator clamp for a roll processing line which reduces or eliminates the problems discussed above with the current clamps.

SUMMARY OF THE INVENTION

In accordance with the teachings of the present invention, clamps for a separating portion of a roll processing line are provided. The clamps include a pair of flattened cylinders which contact the roll to be separated.

It is an important feature that the clamps of the present invention facilitate easier rotation of the roll resulting in more consistent operation.

Another important feature is that the clamps of the present invention reduce the chance of marking or otherwise damaging rolls.

Yet another important feature is that the clamps of the present invention eliminate the potential of scraping the edge and/or the back of the separated roll.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
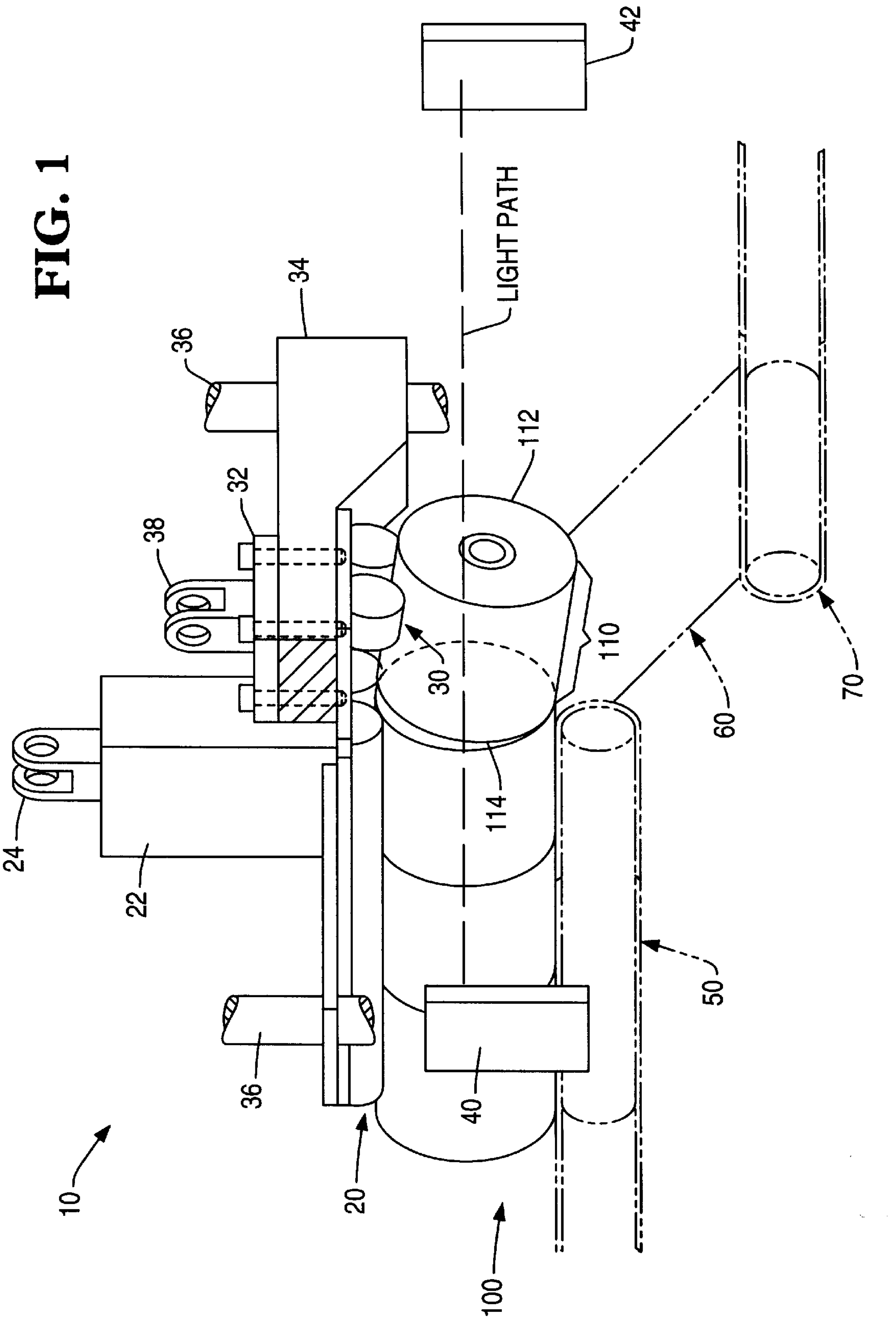
FIG. 1 shows the clamps of the present invention in a separator portion of the roll processing line.

Referring now to the drawings, in which like-referenced characters indicate corresponding elements throughout the several views, attention is first drawn to FIG. 1 which shows a separator portion 10 of a roll processing line including the clamps of the present invention. Throughout this description, the term log will be used to describe the roll product before separation into individual rolls occurs.

A first conveyor 50 transports the log 100 to the separator portion 10 of the roll processing line. The separator portion 10 includes a stationary clamp 20 attached to a stationary clamp mount 22 and a separator clamp 30 attached to a separator clamp mount 32. Separator clamp 30 is mounted adjacent to stationary clamp 20. Separator clamp mount 32 attaches to actuator bar 34. Stationary mount 22 includes a stationary clamp mounting pivot 24 attached to a pneumatic cylinder (not shown). Another pneumatic cylinder (not shown) connects to separator clamp mounting pivot 38 which is located on separator clamp mount 32. Stationary clamp mount 22 and separator clamp mount 32 are raised and lowered along guide pins 36 (not all guide pins are shown for clarity). Both stationary clamp 20 and separator clamp 30 have a unique design described in detail below.

The separator portion 10 of the roll processing line also includes a sensing mechanism or sensor, such as an electric eye 40 and reflector 42 for determining the position of the log to be processed. A discharge chute 60 is located below the separator clamp 30 and a second conveyor 70 is located near the end of the discharge chute 60.

Figure 2A:
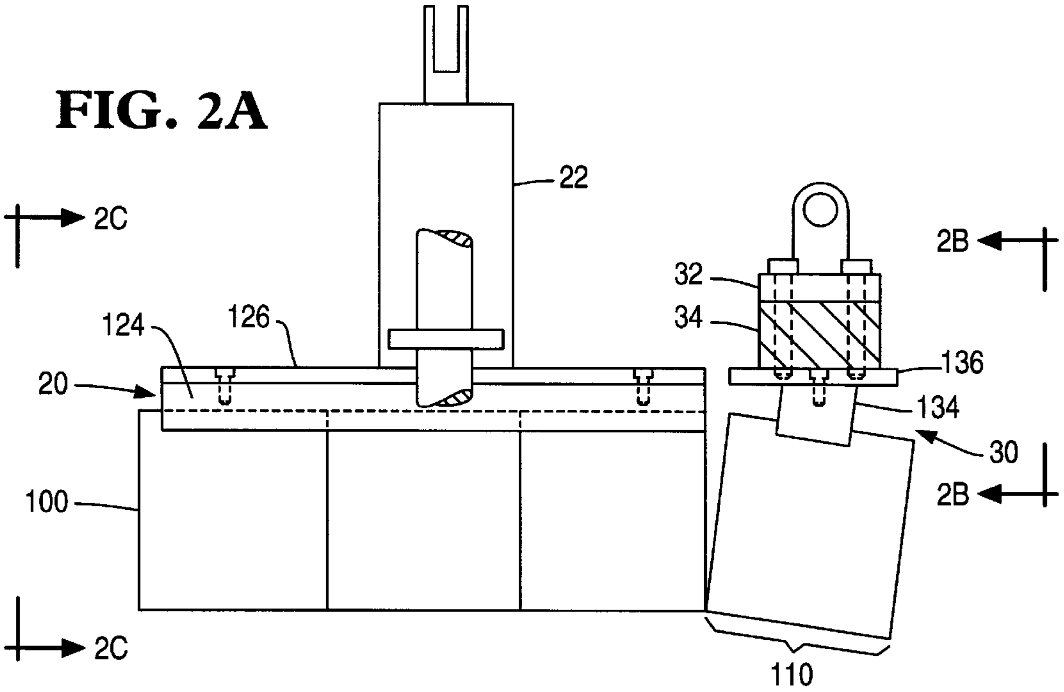
FIGS. 2A, 2B and 2C show side and end views of the clamps of FIG. 1.
Figure 2B:
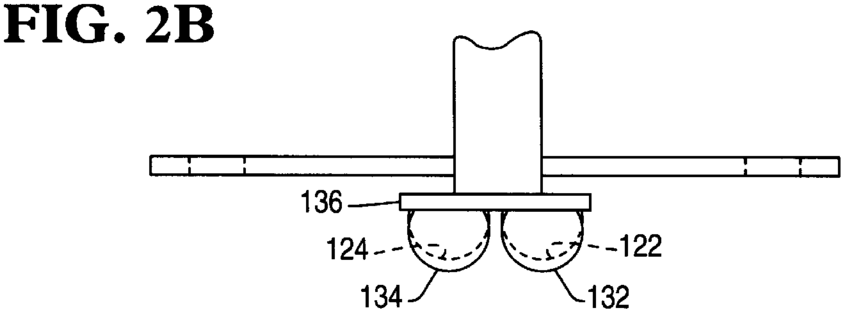
Figure 2C:
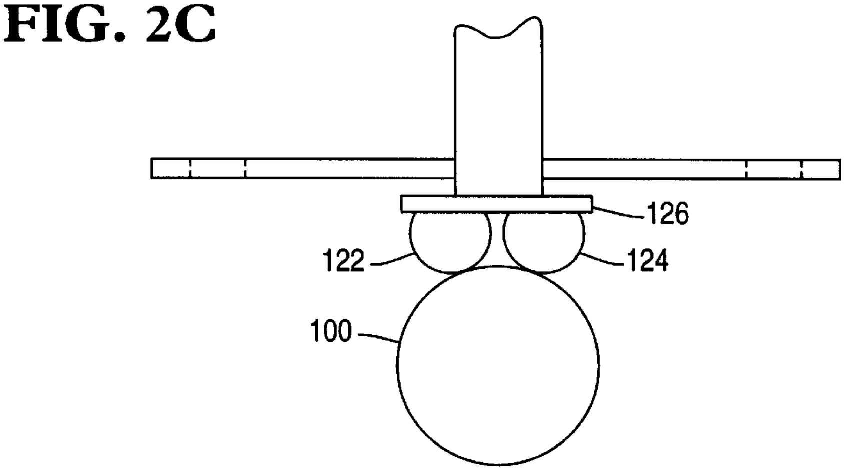

The design of the clamps 20 and 30 will now be described in detail. FIG. 2A shows a side view of the clamps 20 and 30 shown in FIG. 1. FIGS. 2B and 2C show the end views of the clamps 20 and 30 shown in FIG. 1. Stationary clamp 20 and separator clamp 30 each include two partial cylinders (having a flat surface) mounted on the respective plates 126 and 136. The cylinders 122, 124, 132, 134 are preferably formed of a high molecular weight (HMW) plastic such as DELRIN and may be solid or hollow as long as they have enough structural strength to hold the log/roll. The cylinders 122, 124, 132, 134 preferably have a height dimension of approximately 1.25 inches and a radius of approximately 0.875 inches. The cylinders 122, 124 of stationary clamp 20 are mounted with the flat portion adjacent the lower surface of the stationary plate 126. The cylinders 132, 134 of separator clamp 30 are preferably mounted with the flat portion at a slight angle on the lower surface of the separator plate 136, angled away from the stationary clamp 20. Preferably the angle is approximately seven degrees. The separator clamp cylinders 132, 134 have a much shorter dimension than the paper roll to be separated and are mounted nearer the end of the separator plate 136 distal from the stationary plate 126. The stationary plate 126 and the separator plate 136 are preferably formed of steel, but obviously other metals or materials commonly used for industrial tooling may be used. The cylinders and plates may be connected by adhesive, screws, or any appropriate connecting means.

In operation, both stationary and separator clamps 20, 30 can be raised to allow the log 100 to be properly positioned. Then the clamps are lowered to contact the log 100. The edge of the first roll 110 is aligned with the outside edge of the separator clamp 30. The separator clamp 30 is activated when the sensing mechanism detects the leading edge of the roll to be separated. The sensing mechanism indicates the optimum moment to cleanly break off the roll with the separator clamp 30. The trailing or back edge of the roll 110 is lined up with the division between the stationary plate 126 and the separator plate 136. Therefore, only one roll is located beneath the separator clamp 30. The sensing mechanism signals the pneumatic cylinders (not shown) to extend, separating that roll 110 from the log 100.

It is an important feature of the present invention that the separator clamp 30 contacts the roll 110 away from the edges of the roll at an angle to rotate the roll away from the log 100 while separation is occurring. Since the separator clamp 30 contacts the roll 110 away from the edges, there is less likelihood of marking or otherwise damaging the edges of the roll 110. Additionally, since the separator clamp cylinders 132, 134 have a shorter dimension than the roll 110, the separator clamp 30 is able to rotate without interfering with the stationary clamp 20.

The separated roll 110 is directed down a discharge chute 60 and then is lifted onto a second conveyor 70 using a rotary lifter (not shown). A double set of lifting arms on a rotary lifter (not shown) are designed to move past the cutaway edge of the discharge chute 60, lift the separated roll by its width, pivot it across a transfer plate's curved edge and place the roll on its flat side, to be pushed onto the second conveyor 70.

An advantage of the present invention is that the mode of operation of the separator clamp is changed. Instead of putting pressure on the roll points tangent to the separator clamp including along the back or trailing edge of the roll, pressure is placed near the top of the roll and away from either the leading or the trailing edge of the roll, thereby reducing the risk of damaging the roll.

Another advantage is that the separator clamp of the present invention tends to rotate the roll forward to cause separation, in contrast to the current separator clamp which tends to shear the roll downward to cause separation but also increasing the likelihood that the roll will be damaged.

Although the invention has been described including both stationary and separator clamps having similar designs including a pair of flattened cylinders, it is contemplated that the stationary clamp may have various designs which still enable the separator clamp to perform in accordance with the present invention.

Although the invention has been described with particular reference to certain preferred embodiments thereof, variations and modifications of the present invention can be effected within the spirit and scope of the following claims.

What is claimed is:

1. A separation portion of a roll processing line for separating a roll from a log comprising:

a stationary clamp; and a separator clamp including a pair of cylinders for contacting the roll to be separated wherein each of the cylinders has a flat surface, and is attached to a lower surface of the separator clamp, such that the flat surface of each of the cylinders is mounted to the separator clamp and portions of the cylinders which contact the roll are disposed at a slight angle with respect to the separator clamp, and wherein the stationary clamp and the separator clamp are adjacent.

2. The separation portion of claim 1 wherein the stationary clamp includes a pair of flattened cylinders for contacting the log.

3. The separation portion of claim 1 wherein the pair of flattened cylinders of the separator clamp are mounted to angle slightly away from the stationary clamp.

4. The separation portion of claim 1 wherein the pair of flattened cylinders of the separator clamp are located to contact the roll away from the edges of the roll.

5. The separation portion of claim 1 wherein the separator clamp tends to rotate the roll causing separation.

6. A separation portion of a roll processing line for separating a roll from a log comprising:

a pair of mounts;

a pair of actuators connected to the pair of mounts;

a pair of guide pins for guiding the mounts as the actuators extend and contract;

a stationary clamp connected to one of the mounts and including a pair of flattened cylinders for contacting the log; and a separator clamp connected to the other of the mounts and including a pair of cylinders for contacting the roll to be separated wherein each of the cylinders has a flat surface, and is attached to a lower surface of the separator clamp, such that the flat surface of each of the cylinders is mounted to the separator clamp and portions of the cylinders which contact the roll are disposed at a slight angle with respect to the separator clamp, and wherein the stationary clamp and the separator clamp are adjacent.

7. A method of separating a roll from a log comprising the steps of:

providing a stationary clamp;

providing a separator clamp including a pair of cylinders for contacting the roll to be separated wherein each of the cylinders has a flat surface, and is attached to a lower surface of the separator clamp, such that the flat surface of each of the cylinders is mounted to the separator clamp and portions of the cylinders which contact the roll are disposed at a slight angle with respect to the separator clamp, and contacting the upper portion of the log with the stationary clamp;

contacting the upper portion of the roll with the cylinders of the separator clamp; and activating the separator clamp to rotate and separate the roll from the log.

8. The method of claim 7 wherein the stationary clamp further includes a pair of flattened cylinders for contacting the log.

9. The method of claim 7 wherein the step of contacting the upper portion of the roll includes contacting the roll away from the edges of the roll.

* * * * *